United States Patent [19]

Sugeno

[11] Patent Number: 5,284,722
[45] Date of Patent: Feb. 8, 1994

[54] NON-AQUEOUS ELECTROLYTE SECONDARY BATTERY

[75] Inventor: Naoyuki Sugeno, Fukushima, Japan

[73] Assignee: Sony Corporation, Tokyo, Japan

[21] Appl. No.: 851,995

[22] Filed: Mar. 13, 1992

[30] Foreign Application Priority Data

Mar. 13, 1991 [JP] Japan .................................. 3-072197

[51] Int. Cl.$^5$ .......................................... H01M 10/40
[52] U.S. Cl. ..................................... 429/197; 429/218
[58] Field of Search ............... 429/197, 196, 194, 218

[56] References Cited

U.S. PATENT DOCUMENTS

| | | | |
|---|---|---|---|
| 4,751,160 | 6/1988 | Plichta et al. | 429/197 |
| 4,980,250 | 12/1990 | Takahashi et al. | 429/194 |
| 5,053,297 | 10/1991 | Yamahira et al. | 429/194 |
| 5,093,216 | 3/1992 | Azuma et al. | 429/218 |
| 5,169,736 | 12/1992 | Bittihn et al. | 429/197 X |

Primary Examiner—Anthony Skapars
Attorney, Agent, or Firm—Hill, Steadman & Simpson

[57] ABSTRACT

A non-aqueous electrolyte secondary battery, including positive and negative electrodes formed of a composite metal oxide and carbon, respectively, in which charge and discharge are conducted by doping and undoping of Li in a Li-carbon intercalation compound is provided. The non-aqueous electrolyte secondary battery includes an electrolyte. The electrolyte is dissolved in a solvent mixture of propylene carbonate with an ester compound. The ester compound can include, for example, butyl acetate, butyl propionate, butyl lactate, and methyl valerate. Due to the high boiling point of the ester compounds, excellent cycle characteristics for the non-aqueous electrolyte secondary battery can be obtained in high temperature environments.

8 Claims, 3 Drawing Sheets

NON-AQUEOUS ELECTROLYTE SECONDARY BATTERY

BACKGROUND OF THE INVENTION

The present invention relates to a non-aqueous electrolyte secondary battery, and in particular to a non-aqueous electrolyte secondary battery in which positive and negative electrodes are formed of a composite metal oxide including Li and carbon, respectively. New portable electronic devices such as camcorders, portable cellar phones, and laptop computers have been successively developed. As efforts have been made to provide compact and light weight devices, the need for portable batteries having a higher energy density has arisen.

Aqueous solution type batteries such as lead batteries and nickel-cadmium batteries have been primarily used as secondary batteries. Although these batteries exhibit excellent cycle characteristics, they are not satisfactory in term of their energy density, etc. Further, such batteries are problematic as far as protecting the environment is concerned. Development of a secondary battery which can replace these batteries has arisen.

From such circumstances, development of a non-aqueous electrolyte secondary battery (so-called lithium secondary battery) which is pollution-free and has a high energy density due to a high operating voltage has been of great interest.

Since the energy density of the non-aqueous battery depends upon the characteristics of its cathode a number of positive electrodes have been proposed, analyzed and studied.

Success of the development of the secondary battery depends upon whether a lithium battery exhibiting excellent cycle characteristics can be developed.

However, it may be concluded that the satisfactory results of the development of the lithium negative electrode are very few from these points of view.

For example, although a lithium secondary battery having an "AA" size, using lithium for the negative electrode having excellent characteristics has been proposed and introduced, a number of difficulties have been encountered with the lithium negative electrode that have not yet been solved.

In other words, in the non-aqueous electrolyte battery using lithium metal or lithium alloy for the negative electrode, lithium becomes inactive and is deposited under a powdery condition by repetition of charge/recharge cycles. During charging, crystals of a lithium will grow in a dendrite manner and pass through micropores of a separator membrane, or spacings, between fibers of a separator's unwoven fabric to reach a positive electrode, causing an internal short. Accordingly, a satisfactory lifetime of such a battery through repeated charge/recharge cycles can not be obtained. Since the activity of metallic lithium is very high, safety problems have not been solved. Li-Carbon intercalation compound (hereinafter referred to as LI-CIC) electrode has been developed as a material for a negative electrode which may replace a lithium negative electrode. It is deemed that this LI-CIC electrode has a favorable lifetime through repeated cycles. Since the Li-CIC in which carbon is intercalated with lithium ions may take part in a reversible oxidation/reduction reaction involving an electrochemical undoping/doping of lithium ions in an organic electrolyte containing lithium salt, and the oxidation/reduction potential falls in the range of about 0.02 to 1.0 volt, the Li-CIC may provide an excellent negative electrode material for the non-aqueous electrolyte secondary battery if it is used with a proper positive electrode material. Specifically, in a battery system in which the negative electrode is formed of the LI-CIC, the lithium ions which have been doped in the negative electrode carbon migrate to the positive electrode and play a role to guide, in the positive electrode, electrons which come from the negative electrode via an external circuit during discharge. During charge, the lithium ions which have migrated to the positive electrode will return to the negative electrode and play a role to guide, in the negative electrode, the electrons which return via the external circuit. Since no metallic lithium exist in the battery in any charge/discharge cycle, deposition of inactive lithium and growth of dendrite will never occur. Since the crystal structure of the positive and negative electrode activating materials is resistant to breakdown, excellent charge/discharge cycle characteristics can be obtained.

On the other hand, the characteristics of the organic electrolyte used are very important to obtain excellent charge/discharge cycle characteristics in the non-aqueous electrolyte secondary battery. To this end, a number of studies have been made on the relationship between the characteristics of the organic electrolyte and the charge/discharge cycle characteristics and findings which will be described hereafter have been obtained.

1. The conductance of the organic electrolyte is remarkably improved by a combination of a solvent having a high dielectric constant and a solvent having a low viscosity. This can be semi-quantatively explained by the dissociation and mobility of ions in the electrolyte.

2. As the conductance of the electrolyte becomes higher, the polarization of the lithium negative electrode becomes less and the charge/discharge efficiency becomes higher.

3. A system in which propylene carbonate and sulfolane or dimethylsulfoxide are used as a solvent having a high dielectric constant is mixed with 1,2-dimethoxyethane and a solvent having a low viscosity gives a high electric conductance and excellent lithium charge/discharge performance.

However, it has been found from the present inventors' study that when an electrolyte containing, as an organic solvent, a mixture solvent of propylene carbonate and 1,2-dimethoxyethane is used in a non-aqueous electrolyte battery having a negative electrode formed of a Lithium-CIC, the battery exhibits a charge/discharge cycle which is excellent, to some extent, at room temperature while there is a disadvantage that the capacity is rapidly lowered and the cycle life time is shortened to about 1/10 of that at room temperature if charge/discharge cycles are repeated at an elevated temperature (for example, 40° C.).

The secondary batteries which can replace the existing Ni-Cd or lead batteries should, of course, be capable of working temperatures ranging from at least −20° C. to above 40° C.

Therefore, rapid lowering of the capacity of the non-aqueous electrolyte secondary battery having a negative electrode formed of LI-CIC in a high temperature environment is a great obstacle against practical use.

OBJECT AND SUMMARY OF THE INVENTION

It is an object of the present invention to provide a non-aqueous electrolyte secondary battery having a high energy density, which is pollution-free, and in which an excellent cycle life time can be obtained in a high temperature environment.

A number of studies have been conducted to improve the lowering of the cycle life time in use at higher temperatures, from which it has been found that a mixture solvent of propylene carbonate and dimethoxyethane, which has been deemed as the best electrolyte for the prior art secondary battery having a lithium negative electrode, is not necessarily the most suitable for in the non-aqueous electrolyte secondary battery having an negative electrode formed of Li-CIC. Further, it has been determined that among various low viscosity solvents, an electrolyte including an ester compound having a given number of carbon atoms is most suitable and enables a remarkable improvement in the cycle life time in use at higher temperatures.

The present invention provides a non-aqueous electrolyte secondary battery including a positive electrode formed of Li Mo, wherein M represents at least one of Cobalt, Nickel and Manganese and $0.5 \leq X \leq 1$ and a negative electrode formed of carbon, including an organic solvent of an electrolyte that is a mixture solvent of propylene carbonate and an ester compound having a general formula $R_1 COOR_2$, where both $R_1$ and $R_2$ are alkyl groups selected from $CH_3$, $C_2H_5$, $C_3H_7$, and $C_4H_9$.

If the mixture solvent of propylene carbonate and dimethoxyethane, which has been deemed most suitable in the prior are lithium, secondary battery having a negative electrode formed of metallic lithium is used in the non-aqueous electrolyte secondary battery including positive and negative electrodes formed of a composite metal oxide which contains lithium and carbon, respectively, lowering of the capacity is remarkable when charge discharge are repeated in a higher temperature environment.

In contrast to this, if a mixture solvent of propylene carbonate and an ester compound having a given number of carbon atoms is used, an excellent cycle life time can be obtained even in a higher temperature environment since the ester compound has a high boiling point, etc.

Therefore, the non-aqueous electrolyte secondary battery of the present invention is capable of supplying compact portable devices which have recently been developed with sufficient energy for an extended cycle life time without loosing their compact and light weight features. Since the non-aqueous electrolyte secondary battery has excellent charge/discharge cycle characteristics even at high temperatures, it may be used in various fields as a secondary battery which can replace the lead and nickel cadmium batteries.

DESCRIPTION OF THE INVENTION

Figure 1:
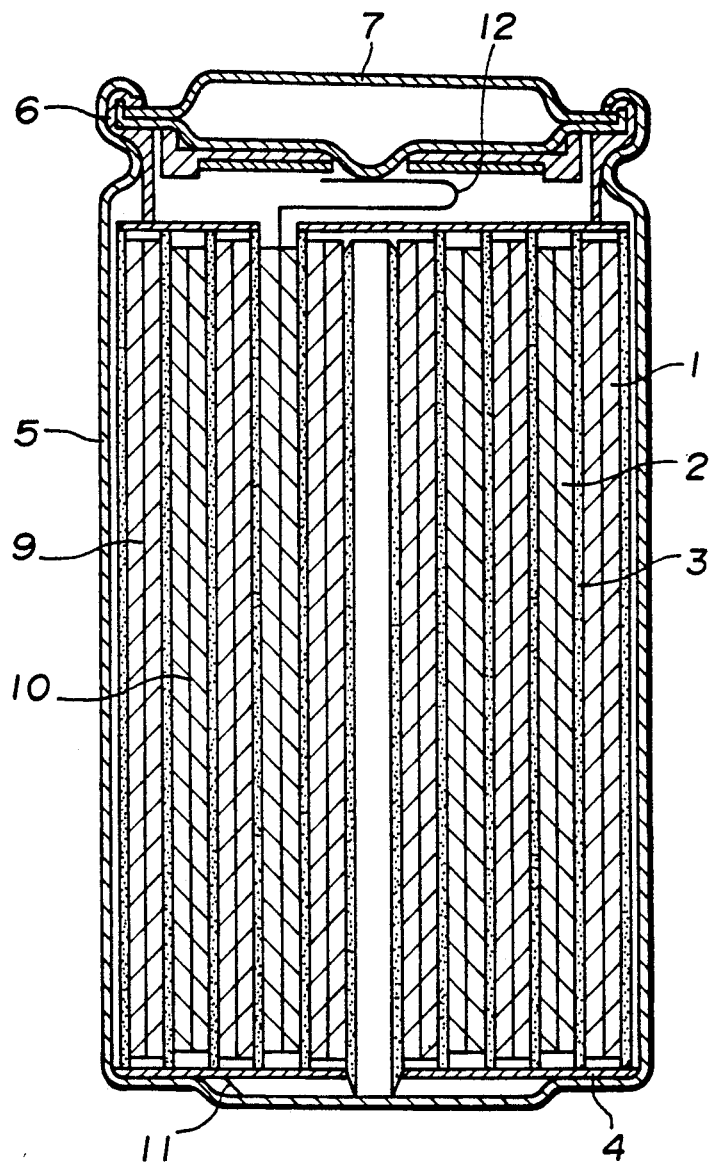
FIG. 1 is a sectional view an illustrating the an example of a cylindrical non-aqueous secondary battery of the present invention.

A battery including positive and negative electrodes formed of $Li_x MO_2$ (for example, $LiCoO_2$) and carbon, respectively, is assembled. The battery is converted into a secondary battery having a negative electrode formed of Li-CIC by a reaction represented by an equation (1). The charge/discharge reaction of the secondary battery is represented by equation (2).

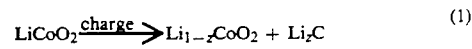

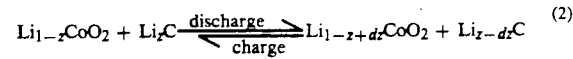

The average discharge voltage of the secondary battery is very high, on the order of about 3.6 volts. Accordingly, a AA size secondary battery having a high energy density, which is not less than 180 wh/1, is provided. The battery can be sufficiently charged by even a comparatively quick charge for an hour. A long life time through about 1200 cycles even at 100% discharge depth has been confirmed.

However, if the organic solvent of the electrolyte is a mixture solvent of propylene carbonate with 1,2-dimethoxiethane, the capacity is rapidly lowered when charge/discharge cycles are repeated at a high temperature (40° C.) and the life time through 1200 cycles is reduced to about 1/10 at room temperature.

Therefore, in accordance with the present invention, a mixture solvent of propylene carbonate with an ester compound having a given number of carbon atoms is used as the organic solvent of the electrolyte to prevent the cycle life time at higher temperatures from being reduced.

A compound represented by the above mentioned general formula, such as butyl acetate, butyl propionate, butyl lactate, or butyl valerate, is used as the ester compound. Since these ester compounds have a higher boiling point than those of the other low viscosity solvents, they are suitable for the organic solvent of the non-aqueous electrolyte secondary batteries for which usage at high temperature for an extended period of time is required.

In this case, in order to obtain an excellent charge/discharge cycle, it is preferable that the mixing ratio of propylene carbonate to the ester compound be in the range of 75:25 to 15:85. If the mixing ratio is in the range of 60:40 to 20:80, an excellent charge/discharge cycle is obtained even at low temperatures.

$LiPF_6$ is most suitable for the electrolyte. $LiAsF_6$, $LiClO_4$ and the like may also be used as well.

A composite metal oxide $LixMO_2$ which contains lithium is used as the positive electrode material. The composite metal oxide preferably includes $LiCoO_2$, $LiNi_y Co_{1-y} O_2$ where in $0<y<1$, $LiNiO_2$, $LiMu_2 O_4$ and mixtures thereof.

Carbon, which is used in this type secondary batteries, may be used for the negative electrode carbon material. Particularly, carbon materials which will be listed hereafter are preferable.

First, carbonaceous material which is obtained by carbonizing an organic material by a technique such as burning is preferable.

An organic material which is a starting material is preferably furan resin composed of a homopolymer or a copolymer of furfuryl alcohol or furfural alcohol. Specifically, polymers of furfural plus phenol; furfuryl alcohol plus dimethylol urea; and furfuryl alcohol; furfuryl alcohol plus formaldehyde; furfural plus ketones are preferable. The carbonaceous material which is carbonized from the furan resin has a surface spacing $d_{002}$ of the surfaces (002) which is not less than 3.70 Å, and does not have an exothermic peak at temperatures of not less than 700° C. in the differential thermal analysis in an air stream and exhibits excellent characteristics for the negative electrode material of batteries.

Alternatively, a precursor having 10 to 20% by weight of oxygen is obtained by introducing functional groups containing oxygen into petroleum pitch having an H/C atom ratio of 0.6 to 0.8, i.e. by conducting so-called oxygen cross-linking. The Carbonaceous material which is obtained by burning the precursor is also preferable. Such carbonaceous material is described in, for example, Japanese Examined Patent Publication Sho 53-31116. In this publication, the carbonized material having a surface spacing $d_{002}$ of the surface (002) which is not less than 3.70 Å and having no exothermic peak above 700° C. in the differential thermal analysis is obtained by optimizing the oxygen content and is used as the negative electrode material.

Further, carbonaceous material in which the content of a dopant relative to lithium is increased by adding phosphorus compound or boron compound to the furan resin or petroleum pitch upon carbonization thereof may be used.

The phosphorus compound may include phosphorus oxides such as phosphorus trioxide, phosphorus tetroxide, phosphorus pentaoxide; oxo acids of phosphorus such as orthophosphoric acid (so-called phosphoric acid); methaphosphoric acid; and the salts of these oxo acids. Phosphoric acid is preferable since it is easy to treat.

It is preferable that the amount of the phosphorus compound which is added on carbonization of the organic material be 0.2 to 15% by weight, in terms of phosphorus relative to the carbonaceous material, in the organic material and that the content of phosphorus in the carbonaceous material be 0.2 to 5.0% by weight.

The boron compound includes boron oxides such as diboron dioxide, diboron trioxide (so-called boron oxide) tetraboron trioxide, tetraboron pentaoxide; oxo acids of boron such as orthoboron (so-called boric acid), methaboric acid, tetraboric acid, and subboric acid and the salts thereof. These boron compounds can be added to a reaction system for carbonization while they are in a solution state.

It is preferable that the amount of the boron compound which is added on carbonization of the organic material be 0.15 to 2.5% by weight in term of boron relative to the carbonize material of the organic material and that the content of the boron in the carbonaceous material be 0.1 to 2.0 by weight.

Examples of the present invention will be described with reference to the experimental results set forth below.

EXAMPLE 1

An exemplary embodiment of a non-aqueous electrolyte secondary battery in which the negative and positive electrodes were formed of graphitization-retardant carbon and a mixture of $LiCoO_2$ with $LiNi_{0.6}Co_{0.4}O_2$, respectively, and the organic solvent of the electrolyte was a mixture solvent of propylene carbonate (PC) with butyl acetate was formed.

In order to prepare a negative electrode, petroleum pitch was provided as a starting material. Thereafter, functional groups containing oxygen were introduced (so-called cross-linked) to the petroleum pitch at 10 to 20%, the pitch was burnt in an inert gas stream at 1000° C. and graphitization-retardant carbon was obtained. X-ray diffraction analysis of the resultant graphitization-retardant carbon showed that the surface spacing of the surfaces (002) was 3.78 Å, and that the true specific weight was 1.58 g/cm$^2$.

This graphitization-retardant carbon was pulverized into carbon powders having an average particle diameter of 10 μm. 90 parts by weight of the powdery carbon was mixed with 10 parts by weight of polyvinylidene, fluoride which was a bonding agent, to prepare a mixture for the negative electrode. The negative electrode mixture was dispersed in a solvent, N-methyl-2-pyrrolidone, to form negative electrode slurry. The negative electrode slurry thus obtained was uniformly applied on the both sides of a strip-like copper foil having a thickness of 10 μm, which later served as a negative electrode collector. After drying, the copper foil was compression molded by a roll press to prepare a strip negative electrode.

On the other hand, in order to prepare a positive electrode, lithium carbonate was mixed with cobalt carbonate at a ratio of 0.5 mole:1 mole. The mixture was burnt in air at 900° C. for 5 hours to obtain $LiCoO_2$. Lithium carbonate, nickel carbonate and cobalt carbonate were mixed with each other at a ratio of 0.5 mole:0.6 mole:0.4 mole, respectively and the mixture was burnt in air at 900° C. for 5 hours to obtain $LiNi_{0.6}Co_{0.4}O_2$.

The 54.6 parts by weight of LiCoO and 30.4 parts by weight of $LiNi_{0.6}Co_{0.4}O_2$ thus obtained were then mixed with 6 parts by weight of graphite, electrically conducting agent and 3 parts by weight of polyvinylidene fluoride to prepare a mixture for the positive electrode. The mixture for the positive electrode was dispersed in N-methyl-2-pyrrolidone to form a slurry for the positive electrode.

After the slurry for the positive electrode was uniformly applied on both sides of a strip-like aluminium foil having a thickness of 20 μm, which later served as a positive electrode collector, and was dried. The aluminium foil was compression molded by a roll press to prepare a strip-like positive electrode.

The length and width of the strip-like negative electrode 1, the strip-like positive electrode 2 and a separator 3 formed of a micro-porous polypropylene film were preliminarily adjusted so that they were properly disposed in a spiral manner within a battery can 5 having an outer diameter of 20 mm and a height of 51 mm as shown in FIG. 1. Spiral electrodes were thus formed.

The thus formed spiral electrodes were housed in the iron battery can 5, which was plated with nickel, and insulating plates 4 were placed upon both the upper and the lower sides of the housed spiral electrodes. Positive electrode leads 11 and 12 formed of aluminium, were guided from positive and negative electrode collectors, respectively, and welded to the battery can 5.

$LiPF_6$ was dissolved in a mixture solvent including 50% by volume of propylene carbonate and 50% by volume of butyl acetate at a ratio of 1 mole/l to prepare an electrolyte. The electrolyte was poured into the battery can 5 and a battery lid 7 was secured to the battery can 5 by caulking the battery can 5 to form an asphalt coated insulating sealing. A gasket washer disposed between the lid 7 and the can 5 to form a cylindrical non-aqueous electrolyte battery (battery in Example 1) having a diameter of 20 mm and a height of 50 mm.

COMPARATIVE EXAMPLE 1

In a comparative Example 1, a mixture solvent of propylene carbonate with dimethoxyethane was used as an organic solvent in lieu of the mixture solvent of propylene carbonate with butyl acetate of Example 1.

A cylindrical non-aqueous electrolyte secondary battery (battery of Comparative Example 1) was manufactured similarly to Example 1, except that $LiPF_6$ was dissolved into propylene carbonate and 1,2-dimethoxyethane.

EXAMPLE 2

In this Example, a cylindrical non-aqueous electrolyte secondary battery in which a negative electrode was formed of graphitization-retardant carbon, the positive electrode was formed of $LiCoO_2$ and the organic solvent of an electrolyte was a mixture solvent of propylene carbonate with butyl acetate was manufactured.

Spiral electrodes were prepared similarly to those of Example 1, except that the mixture for the positive electrode was prepared by mixing 91 parts by weight of $LiCoO_2$, 3 parts by weight of polyvinylidene fluoride and 6 parts by weight of graphite with each other, and the spiral electrodes were then housed in a battery can and welded thereto. An electrolyte was prepared by dissolving $LiPF_6$ into a mixture solvent including 50% by volume of propylene carbonate and 50% by volume of butyl acetate. The electrolyte was poured into the battery can and a battery lid was secured to the battery can, by caulking the battery can so that an asphalt coated insulative sealing gasket was disposed between the lid and the can. A cylindrical non-aqueous electrolyte secondary battery (battery in Example 2) having a diameter of 20 mm and a height of 50 mm was thus manufactured.

In the batteries of Examples 1 and 2 and Comparative Example 1 which were manufactured as described above, charge/discharge cycles were repeated at 45° C. and the discharge capacity at each cycle was measured. The results are shown in FIG. 2.

Charge was conducted at a charging voltage of 4.1 volts and a constant current of 1 A for three hours, and discharge was conducted through a constant resistor of 6.2 Ω until the terminating voltage dropped to 2.75 volts.

Figure 2:
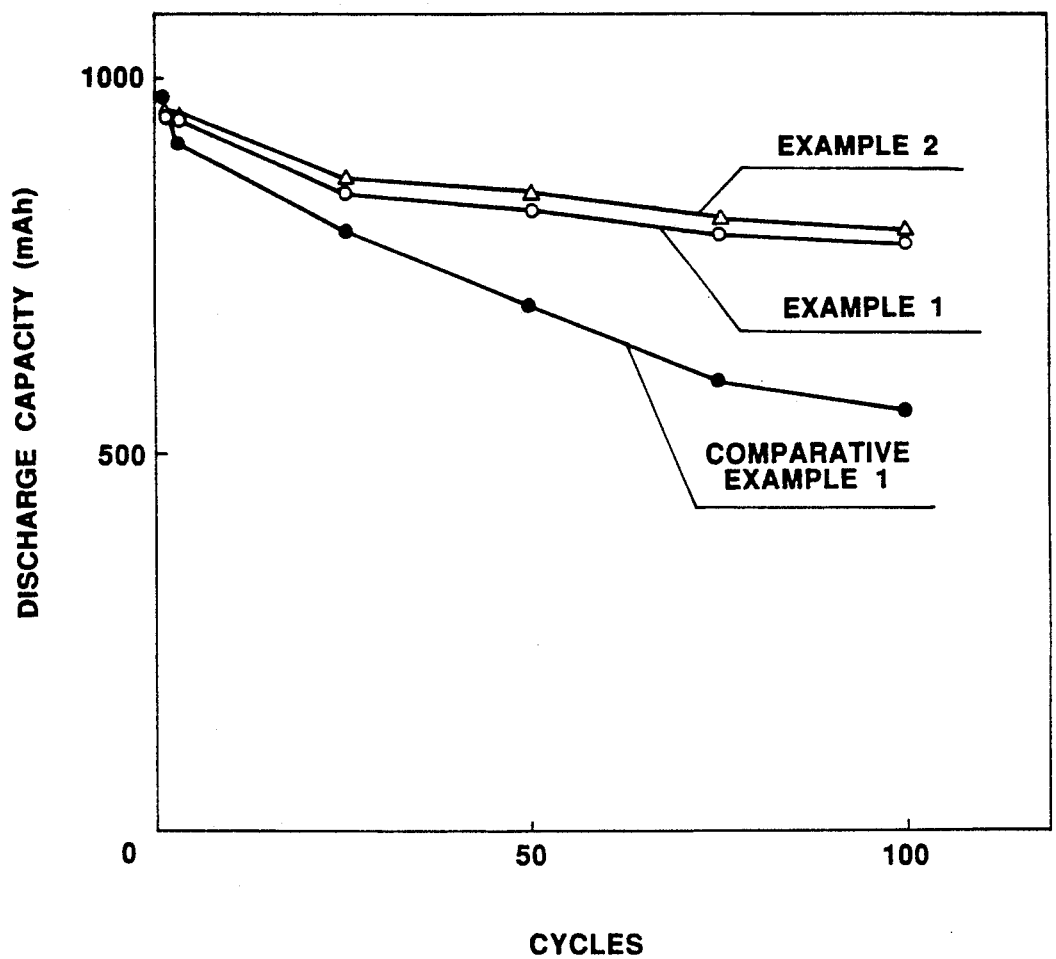
FIG. 2 is a graph showing differences between the charge/discharge cycle characteristics in cases where mixtures of $LiCoO_2$ with $LiNi_{0.6} Co_{0.4} O_2$ are used as a positive electrode material.

As is apparent from FIG. 2, the battery of Comparative Example 1 exhibits a large decrease in the discharge capacity due to repetition of charge/discharge cycles. The initial discharge capacity of 980 mAh is lowered to 560 mAh (57%) at the 100th cycle. In contrast, in the battery of Example 1, the initial discharge capacity of 950 mAh is only lowered to 810 mAh (85%) at the 100th cycle. In the battery of Example 2, the initial discharge capacity of 970 mAh is only lowered to 825 mAh (85%) at 100th cycle.

Similar charge/discharge cycle tests that were conducted at room temperature show that the batteries of Examples 1 and 2 and Comparative Example 1 exhibit the same lowering of the discharge capacity due to equivalent repetition of charge/discharge cycles and that the discharge capacity at the 100th cycle is about 90% of the initial capacity.

In the battery of Comparative Example 1 using a mixture solvent of propylene carbonate with dimethoxyethane, the discharge capacity is remarkably lowered. It is understood that in the batteries of Examples 1 and 2 in which an electrolyte which is a mixture solvent of propylene carbonate with an ester compound is used in accordance with the present invention, the discharge capacity is only slightly lowered even at 45° C., in comparison with the case at room temperature, and the effects of the present invention are distinct.

EXAMPLES 3 TO 5

In each of Examples 3 to 5, a mixture solvent of propylene carbonate with one of various ester compounds was used as an organic solvent in lieu of the mixture solvent of propylene carbonate with butyl acetate of Example 2.

Cylindrical non-aqueous electrolyte secondary batteries (batteries of Examples 3 to 5) were manufactured similarly to that of Example 2, except that the electrolytes shown in Table 1 were used.

TABLE 1

| | COMPOSITIONS OF ELECTROLYTE | | |
|---|---|---|---|
| EXAMPLE 2 | 50% BY VOL. OF PROPYLENE CARBONATE | 50% BY VOL. OF BUTYL ACETATE | 1 MOLE/l LiPF6 |
| EXAMPLE 3 | 50% BY VOL. OF PROPYLENE CARBONATE | 50% BY VOL. OF BUTYL PROPIONATE | 1 MOLE/l LiPF6 |
| EXAMPLE 4 | 50% BY VOL. OF PROPYLENE CARBONATE | 50% BY VOL. OF BUTYL LACTATE | 1 MOLE/l LiPF6 |
| EXAMPLE 5 | 50% BY VOL. OF PROPYLENE CARBONATE | 50% BY VOL. OF BUTYL LACTATE | 1 MOLE/l LiPF6 |
| COMPARATIVE EXAMPLE 2 | 50% BY VOL. OF PROPYLENE CARBONATE | 50% BY VOL. OF 1. 2-DIMETHOXYETHANE | 1 MOLE/l LiPF6 |

COMPARATIVE EXAMPLE 2

In this Comparative Example, a mixture solvent of propylene carbonate with dimethoxyethane was used in lieu of the mixture solvent of propylene carbonate with butyl acetate of Example 2.

A cylindrical non-aqueous electrolyte secondary battery (battery of Comparative Example 2) was manufactured similarly to Example 2, except that an electrolyte was prepared by dissolving LiPF into propylene carbonate and 1,2-dimethoxyethane.

Figure 3:
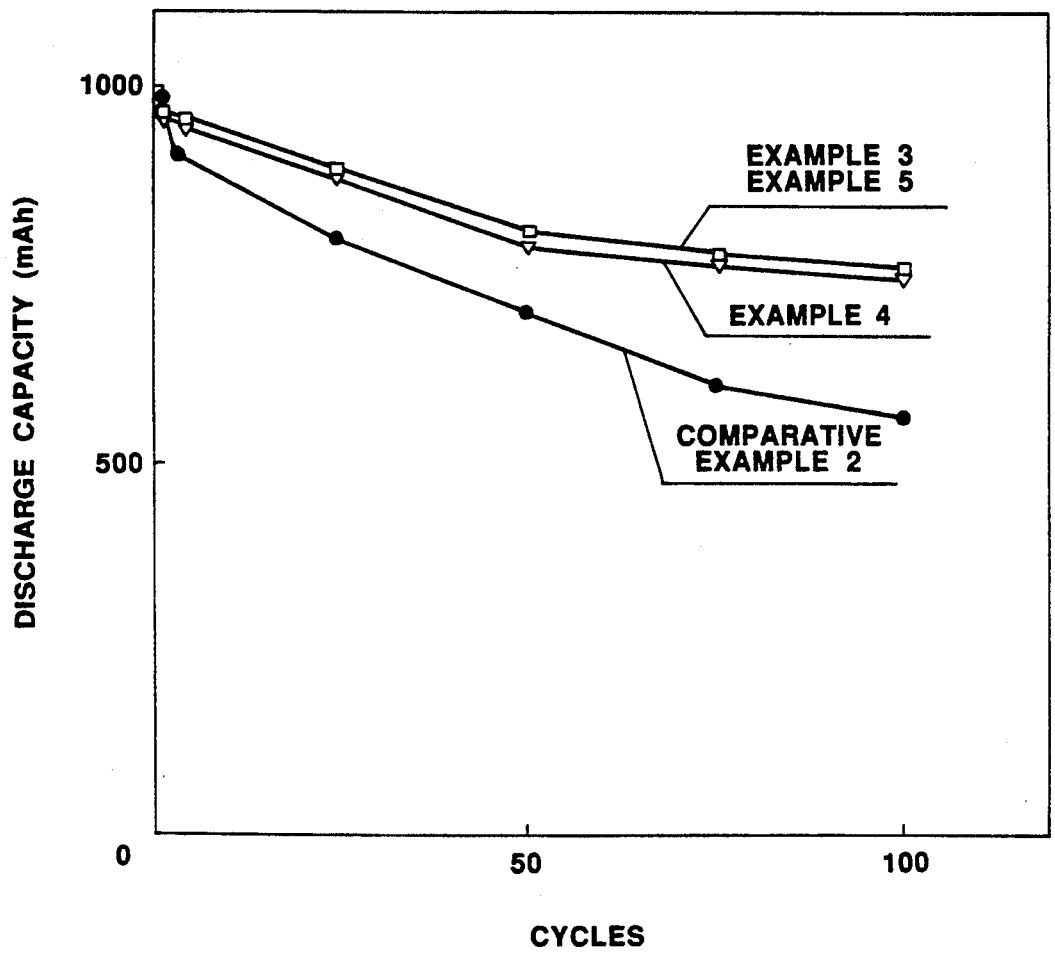
FIG. 3 is a graph illustrating the differences between the charge/discharge cycle characteristics in cases where $LiCoO_2$ is used as a positive electrode material.

In the batteries of Examples 3 to 5 and Comparative Example 2, which were manufactured as discussed above, charge/discharge cycles were repeated at 45° C., and the discharge capacity at each cycle was measured. The results are shown in FIG. 3. The discharge capacity at the 100th cycle is shown in Table 2.

Charge was conducted at a charging voltage of 4.1 volts and a constant current of 1 A for three hours and discharge was conducted through a constant resistor of 6.2 Ω until the terminating voltage dropped to 2.75 volts.

TABLE 2

| | INITIAL DISCHARGE CAPACITY A (mAh) | DISCHARGE CAPACITY AT 100th CYCLE B (mAh) | A/B (%) |
|---|---|---|---|
| EXAMPLE 3 | 970 | 760 | 78.4 |
| EXAMPLE 4 | 960 | 740 | 77.1 |
| EXAMPLE 5 | 960 | 760 | 79.2 |
| COMPARATIVE EXAMPLE 2 | 980 | 550 | 56.1 |

As is apparent from FIG. 3 and Table 2, the battery of Comparative Example 2 exhibits a large decrease in the discharge capacity due to repetition of charge/discharge cycles. The initial discharge capacity of 980 mAh was lowered to 550 mAh (56.1%) at the 100th cycle. In contrast, in any of the batteries of Examples 3 to 5, the initial discharge capacity was only lowered to 85% at the 100th cycle.

Similar charge/discharge cycle tests that were conducted at room temperature show that the batteries of Examples 3 to 5 and Comparative Example 2 exhibit the same lowering ratio of the discharge capacity due to repetition of the charge/discharge cycles and that the discharge capacity at the 100th cycle is about 88% of the initial capacity.

In the battery of Comparative Example 2 using a mixture solvent of propylene carbonate with dimethoxyethane, the discharge capacity is remarkably lowered at 45° C. It is understood that in the batteries of Examples 3 to 5 in which an electrolyte, which is a mixture solvent of propylene carbonate with an ester compound, is used in accordance with the present invention, the discharge capacity is only slightly lowered even at 45° C., in comparison with the case at room temperature and the effects of the present invention are distinct.

It is required that the non-aqueous electrolyte secondary battery be capable of being used at 60° C., depending upon the object of usage, as well as 45° C. It is desired that the electrolyte has a boiling point not lower than 80° C.

Therefore, voltage resistances of the batteries of Examples 1 to 5 and Comparative Example 2 at temperatures not higher than 60° C. were studied. A charging voltage of 4.0 volts was continuously applied to each battery at temperatures lower than 60° C. for 30 days and the discharge capacity before and after the application of the voltage was measured. The measurement of the discharge voltage was conducted until the charged voltage was lowered to a terminating voltage of 2.5 volts by discharging through a constant resistor of 6.2 Ω. The results are shown in Table 3.

TABLE 3

| | INITIAL DISCHARGE CAPACITY A (mAh) | DISCHARGE CAPACITY AFTER APPLYING VOLTAGE AT 60° C. FOR 30 DAYS B (mAh) | A/B (%) |
|---|---|---|---|
| EXAMPLE 1 | 950 | 825 | 86.8 |
| EXAMPLE 2 | 970 | 830 | 85.6 |
| EXAMPLE 3 | 970 | 840 | 86.6 |
| EXAMPLE 4 | 960 | 825 | 86.0 |
| EXAMPLE 5 | 960 | 830 | 86.4 |
| COM. EX. 1 | 980 | 570 | 58.1 |
| COM. EX. 2 | 980 | 560 | 57.1 |

As is apparent from Table 3, the batteries of Examples 1 to 5 hold 80% of the initial discharge capacity even after a voltage was continuously applied at 60° C. for 30 days. On the other hand, in the batteries of Comparative Examples 1 and 2, the discharge capacity is lowered to not higher than 60% of the initial capacity after a voltage is applied for 30 days. From these results, effects of use of the mixture solvent of propylene carbonate with an ester compound in accordance with the principles of the present invention become more clear.

I claim:

1. A non-aqueous electrolyte secondary battery comprising:
   a positive electrode formed of $Li_xMO_2$, wherein M represents at least one of Cobalt, Nickel and Manganese and $0.5 \leq x \leq 1$;
   a negative electrode formed of carbon; and
   an organic solvent of an electrolyte, wherein the organic solvent is a mixture solvent of propylene carbonate and ester compound having a general formula $R_1COOR_2$, where both $R_1$ and $R_2$ are alkyl groups selected from the group consisting of $CH_3$, $C_2H_5$, $C_3H_7$ and $C_4H_9$.

2. A non-aqueous electrolyte secondary battery as claimed in claim 1, in which the positive electrode is formed of at least one of $LiCoO_2$, $NiNi_y Co_{1-y} O_2$ wherein $0 \leq y \leq 1$, $LiNiO_2$ and $LiMn_2O_4$.

3. A non-aqueous electrolyte secondary battery as claimed in claim 1, wherein the negative electrode is formed of a carbon having a surface spacing $d_{002}$ of the surface (002) which is not less than 3.70 Å, wherein the carbon only has an exothermic peak at temperatures of less than 700° C. in the differential thermal analysis.

4. A non-aqueous electrolyte secondary battery claimed in claim 1, in which the negative electrode is formed of carbon obtained by adding a phosphorous or a boron compound to an organic material to form a resulting material, and burning the resulting material.

5. A non-aqueous electrolyte secondary battery as claimed in claim 1, in which the ester compound is at least one of butyl acetate, butyl propionate, butyl lactate and methyl valerate.

6. A non-aqueous electrolyte secondary battery as claimed in claim 1, in which the mixing ratio of propylene carbonate to the ester compound is 60:40 to 20:80.

7. A non-aqueous electrolyte secondary battery as claimed in claim 1, in which the mixing ratio of propylene carbonate to the ester compound is 75:25 to 15:85.

8. A non-aqueous electrolyte secondary battery as claimed in claim 1, in which the electrolyte contains $LiPF_6$.

* * * * *